(12) United States Patent
Heim

(10) Patent No.: US 8,930,652 B2
(45) Date of Patent: Jan. 6, 2015

(54) METHOD FOR OBTAINING A SNAPSHOT IMAGE OF A DISK SHARED BY MULTIPLE VIRTUAL MACHINES

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 378 days.

(21) Appl. No.: 12/616,376

(22) Filed: Nov. 11, 2009

(65) Prior Publication Data

US 2011/0113206 A1  May 12, 2011

(51) Int. Cl.
  *G06F 12/00*  (2006.01)
  *G06F 11/14*  (2006.01)
  *G06F 9/44*   (2006.01)
  *G06F 9/455*  (2006.01)
  *G06F 11/20*  (2006.01)

(52) U.S. Cl.
  CPC ........ *G06F 9/45558* (2013.01); *G06F 11/1484* (2013.01); *G06F 2009/45562* (2013.01); *G06F 9/4418* (2013.01); *G06F 11/2094* (2013.01); *G06F 2201/84* (2013.01)
  USPC .............................................. 711/162; 718/1

(58) Field of Classification Search
  CPC . G06F 9/45558; G06F 3/1462; G06F 9/5027; G06F 9/5055; G06F 8/63; G06F 2009/4557; G06F 2009/45562; G06F 2009/45575; G06F 9/455; G06F 11/1484; G06F 2009/45583; G06F 2201/815; G06F 3/0664; G06F 3/0665; G06F 9/45504
  USPC .............................................. 711/162; 718/1
  See application file for complete search history.

(56) References Cited

U.S. PATENT DOCUMENTS

| | | | | |
|---|---|---|---|---|
| 2007/0130566 A1* | 6/2007 | van Rietschote et al. | .......... | 718/1 |
| 2007/0162512 A1* | 7/2007 | Kollar et al. | .................. | 707/200 |
| 2009/0260007 A1* | 10/2009 | Beaty et al. | ....................... | 718/1 |
| 2010/0077160 A1* | 3/2010 | Liu et al. | ....................... | 711/162 |
| 2010/0257523 A1* | 10/2010 | Frank | ................... | 718/1 |
| 2010/0299309 A1* | 11/2010 | Maki et al. | .................... | 707/640 |
| 2011/0047340 A1* | 2/2011 | Olson et al. | .................. | 711/162 |

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.
Galvin, Peter Baer, "VMware vSphere vs. Microsoft Hyper-V: A Technical Analysis," Corporate Technologies, CTI Strategy White Paper, 2009, 32 Pages.

* cited by examiner

*Primary Examiner* — Hashem Farrokh
(74) *Attorney, Agent, or Firm* — Lowenstein Sandler LLP

(57) ABSTRACT

Methods for obtaining a snapshot of a shared virtual machine (VM) image are described herein. In response to a request for obtaining a snapshot of a first VM image stored in a storage disk accessed and shared by a plurality of VMs, a virtualization manager selects a VM from the plurality of VMs hosted within one or more hosts. First needs to notify others to prepare for the snapshot by pausing, etc. A process associated with the selected VM is configured to capture a snapshot from the first VM image, generating a second VM image to be stored in storage disk. Thereafter, the virtualization manager notifies the plurality of VMs to utilize the second image after the second VM image has been generated.

21 Claims, 4 Drawing Sheets

METHOD FOR OBTAINING A SNAPSHOT IMAGE OF A DISK SHARED BY MULTIPLE VIRTUAL MACHINES

TECHNICAL FIELD

Embodiments of the present invention relate generally to network computing. More particularly, embodiments relate to techniques for obtaining a snapshot image of a disk shared by multiple virtual machines.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

The virtualization technologies have wide applications in the computer field with the development of computer systems. For example, such virtualization technologies can be used to implement a virtual desktop application which runs within a virtual machine and can be accessed from a client over a network.

When there are multiple VMs that share the same VM image, taking a snapshot may cause certain disruptions to operations of the VMs.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, when there are multiple VMs that share the same VM image, taking a snapshot may cause certain disruptions to operations of the VMs.

According to some embodiments, a mechanism is provided for synchronizing data among multiple VMs (e.g., distributed VMs) that share a disk supporting snapshots of VM images. The snapshots are managed by a host hosting the VMs rather than a central storage server. According to one embodiment, when a request is received to take a snapshot of a VM image stored in a storage device such as a disk shared by multiple VMs (e.g., for the backup purpose), a manager is configured to communicate and to prepare all VMs to be ready for taking the snapshot. For example, the manager may suspend some or all VMs' operations and flush any pending input and output (IO) activities to the VM image of the shared disk before taking the snapshot. In one embodiment, the manager may select one of the VMs to take a snapshot of the VM image stored in the disk, which creates a new active snapshot VM image, where the original VM image can be used as a backup copy. Once the new active snapshot VM image has been created, the manager may notify the VMs to utilize the new VM image going forward and the VMs may resume their operations respectively using the new VM image.

Figure 1:
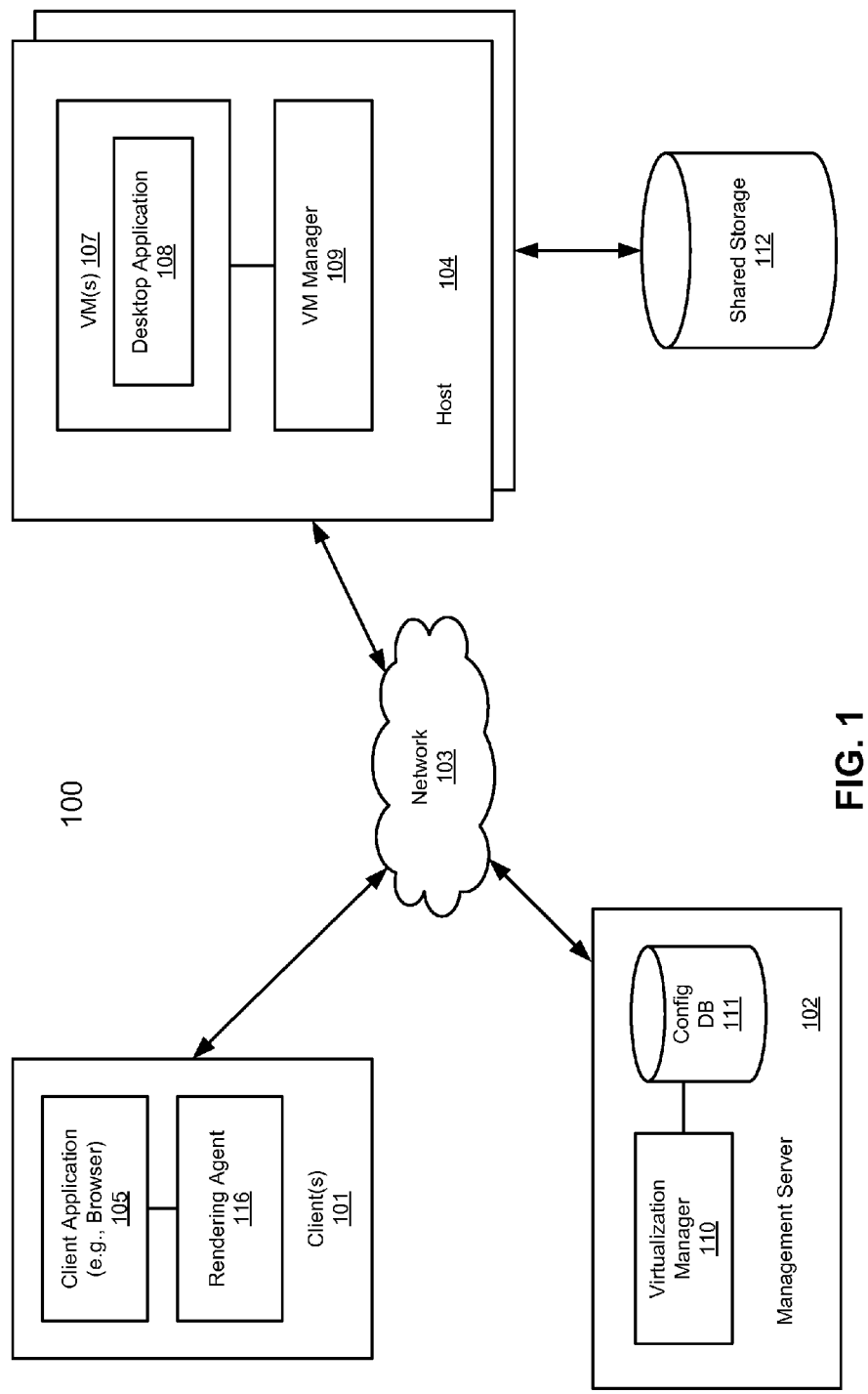
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines (VMs) 107 managed by a VM manager 109. Each of the VMs 107 may host one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be configured and managed by a virtualization manager 110 of a management server 102 using a variety of network management protocols, such as, for example, simple network management protocol (SNMP). Configuration information (e.g., parameters) of host 104 and/or client 101 may be stored in a configuration database 111. For example, in a graphics remoting application, host server 104 may be implemented as a VDS server while management server 102 may be implemented as a virtual desktop control (VDC) server.

In one embodiment, server 104 may be a member of a cluster of servers, where each of the member servers of the same cluster is coupled to the same network or the same segment of a network, also referred to as a logical network. In addition, all server members of a cluster may share disk storage 112, for example, over a storage network. The shared disk storage 112 may be used to store VM images (e.g., virtual desktop images) shared by multiple VMs 107. A VM image may include code base of a guest OS and guest applications, libraries, and data used by the guest OS and guest applications, etc.

According to certain embodiments, when a request is received to take a snapshot of a VM image stored in disk 112 and shared by multiple VMs 107 (e.g., for the backup purpose), manager 110 is configured to communicate and prepare all VMs 107 to be ready for taking the snapshot. For example, manager 110 may communicate with manager 109 to suspend some or all operations of VMs 107 and to flush any pending input and output (IO) activities to the VM image of the shared disk 112 before taking the snapshot. In one embodiment, manager 110 (e.g., in communications with manager 109) may select one of the VMs 107 to take a snapshot of the VM image stored in disk 112, which creates a new active snapshot VM image, where the original VM image can be used as a backup copy. Once the new active snapshot VM image has been created, manager 110 and/or manager 109 may notify VMs 107 to utilize the new VM image going forward and VMs 107 may resume their operations respectively using the new VM image. Note that VMs 107 may include multiple VMs that may reside on the same host or different hosts that share the same storage 112.

Figure 2:
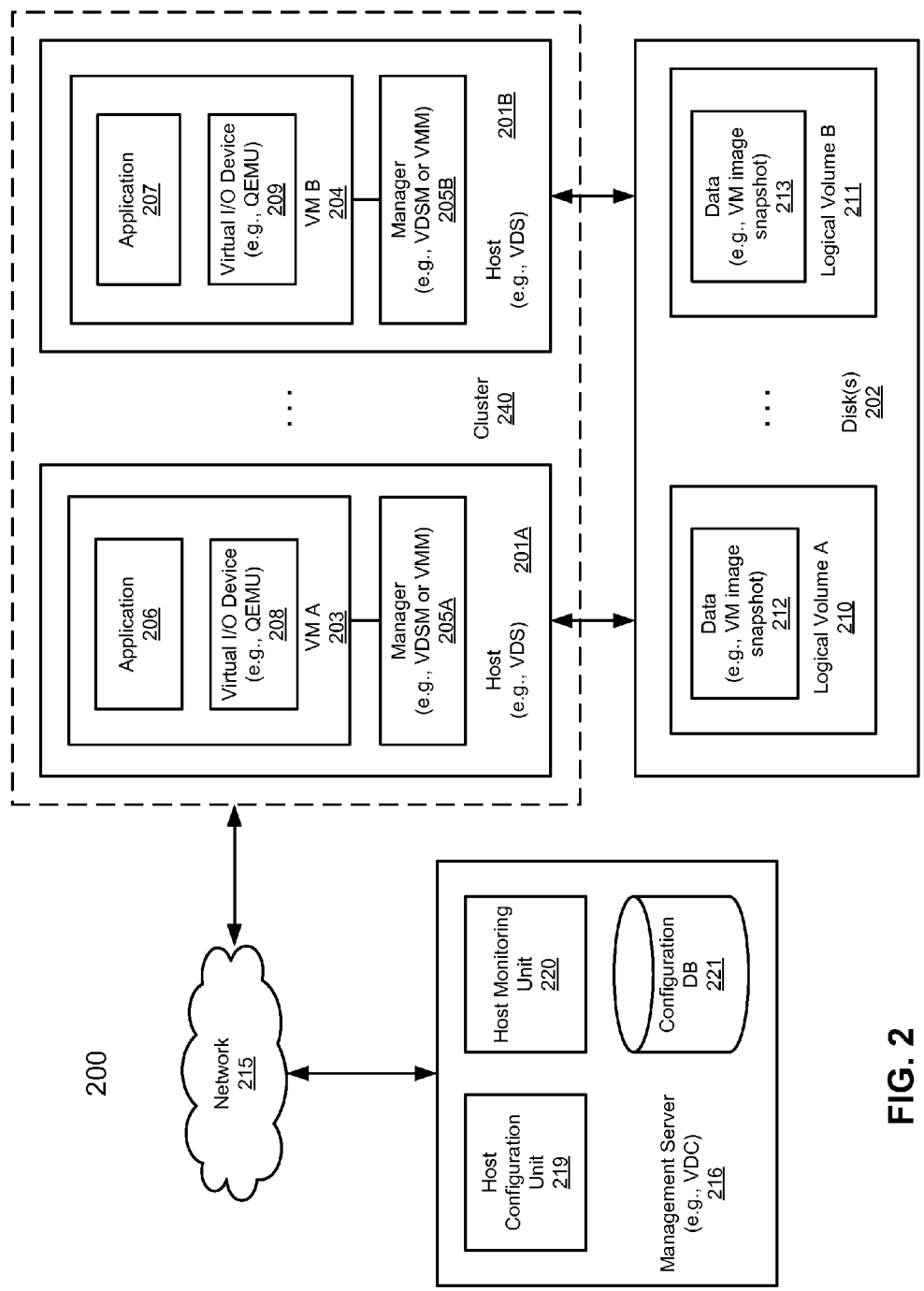
FIG. 2 is a block diagram illustrating an example of a virtualization system according to one embodiment.

FIG. 2 is a block diagram illustrating an example of a virtualization system according to one embodiment of the invention. For example, hosts 201A-201B may be implemented as part of a host 104 (e.g., VDS) and disk 202 may be implemented as part of storage 112 of FIG. 1. Management server 216 may be implemented as part of management server 102 (e.g., VDC) of FIG. 1. Referring to FIG. 2, system 200 includes one or more hosts 201A-201B communicatively coupled to a storage disk 202. Hosts 201A-201B may host one or more VMs 203-204 respectively, which may be managed by VM managers 205A-205B respectively, which may be a VMM or Hypervisor, or alternatively a VDSM. VMs 203-204 may be implemented as part of VMs 107 of FIG. 1. Each VM may host one or more applications (e.g., applications 206-207) such as virtual desktop applications in a graphics remoting environment.

In addition, management server 216 includes a host monitoring unit 220 and a host configuration unit 219, which may be implemented as part of virtualization manager 110 of FIG. 1. The host configuration unit 219 and host monitoring unit 220 are configured to configure and monitor hosts 201A-201B over network 215 using a variety of network management protocols such as SNMP. For example, host monitoring unit 220 of management server 216 may periodically communicate with managers 205A-205B of hosts 201A-201B to receive certain signals (e.g., heartbeats) indicating that the respective hosts are operating correctly. The configuration information and operating statues of hosts 201A-201B may be stored in database 221.

In addition, a shared storage such as a disk 202 is coupled to hosts 201A-201B. Disk 202 may be coupled to hosts 201A-201B over a variety of storage networks or protocols, such as, for example, storage area network (SAN), network file system (NFS), Internet small computer system interface (iSCSI), and/or fibre channel, etc. Disk 202 may include one or more storage volumes 210-211, which may be physical or logical volumes. Each volume may store one or more VM images used by VMs 203-204. For example, data 212 may be part of virtual desktop images used by a virtual desktop application such as applications 206-207. Applications 206-207 may access data 212-213 via their respective virtual IO devices such as virtual IO devices 208-209. Such a virtual IO device may be a hardware emulator such as QEMU emulator in a kernel-based VM architecture. For example, virtual IO devices 208-209 may be virtual storage devices that are used to access data 212-213 stored in disk 202.

According to one embodiment, when a request is received to take a snapshot of a VM image stored in disk 202 and shared by multiple VMs 203-204 (e.g., for the backup purpose), host configuration unit 219 is configured to communicate with managers 205A-205B to prepare all VMs 203-204 to be ready for taking the snapshot. The request may be received from a user or administrator, or alternatively, it may be triggered by a prescheduled event (e.g., backup process event). For example, host configuration unit 219 may suspend some or all operations of VMs 203-204 and flush any pending input and output (IO) activities to the VM image of the shared disk 202 before taking the snapshot. In one embodiment, host configuration unit 219 may select one of the VMs 203-204 to take a snapshot of the VM image stored in disk 202, which creates a new active snapshot VM image, where the original VM image may become a read-only copy. Once the new active snapshot VM image has been created, host configuration unit 219 may notify VMs 203-204 to utilize the new VM image going forward and VMs 203-204 may resume their operations respectively using the new VM image.

For example, for the purpose of illustration, it is assumed that applications 206-207 of VMs 203-204 are currently using VM images 212 stored in volume 210 of disk 202 via their respective virtual IO devices 208-209. When a request for taking a snapshot of data 212 is received, host configuration unit 219 may notify (e.g., via manager 205A or 205B) VMs 203-204 to suspend some or all of the pending IO activities (e.g., read and write activities) to data 212. A snapshot of data 212 is then taken, which creates a new image, in this example, data 213. Once the new image 213 has been created, host configuration unit 219 may notify VMs 203-204 to utilize the new data image 213 and data 212 may become a backup copy. Suspending IO may cause problems of timeouts to the guest and its applications. So it may notify to suspend IO, but may simply notify to pause the VM entirely (which means halting the cpu as well). Suspending only IO is an option passive nodes of an active/passive cluster, only for the shared data disk being snapshot-ed.

After VMs 203-204 resume their operations, within a grace period of time, the original pending IO activities may continue accessing data 212, while new activities may access data 213. In this situation, the residual IO activities to data 212 may be copied to data 213 (e.g., via copy-on-write operations). Alternatively, all pending IO activities are flushed to data 212 before taking the snapshot. If there is an error occurred in any of the VMs 203-204 during the transition from data 212 to data 213, which may be monitored by host monitoring unit 220, all VMs 203-204 may roll back to a previous copy or the last known good copy of the VM image, in this example, data 212.

In one embodiment, one of the VMs 203-204 may be selected by host configuration unit 219 to take the snapshot. Alternatively, the snapshot may be taken by one of managers 205A-205B. A VM that performs the most IO activities to disk 202 may be selected to take the snapshot, which may be based on the statistics of the VMs collected over a period of time (e.g., monitored by host monitoring unit 220 and/or manager 205A or 205B). Such a VM may be the last VM to be suspended prior to taking the snapshot and such a VM may be the first one to resume thereafter. Such an optimization is useful because typically in certain types of clusters, one host is active while others are passive.

Since sometimes clusters perform multiple services using different disks, instead of suspending all VMs, according to one embodiment, host configuration unit 219 may instruct the corresponding virtual IO devices 208-209 to suspend all write operations to disk 202 without suspending the corresponding VMs. That is, instead of suspending the VMs which also suspends all IO activities to all disks, the system only suspends a virtual IO device corresponding to a disk in which a snapshot is to be taken. As a result, the IO activities to other disks are not disrupted.

Note that snapshots are usually related to metadata on certain data blocks such as copy-on-write (COW) blocks. Thus, there is a need to synchronize the metadata among multiple VMs (i.e., their respective QEMU processes). According to one embodiment, one VM has to receive an approval from another VM before changing or committing change of the metadata (e.g., synchronous way). Alternatively, one VM has to lock and refresh the metadata before reading the metadata (e.g., asynchronous way). Another approach is that a guest would not read data from the storage before the storage changes to an active state. The change of storage to an active state would cause a collaborative change in a virtual IO device (e.g., QEMU) to re-read the metadata and to change the state of the guest to the storage (e.g., changing a previous active state to a read-only state).

Note that some or all of the components as shown in FIG. 2 may be implemented in software, hardware, or a combination of both.

Figure 3:
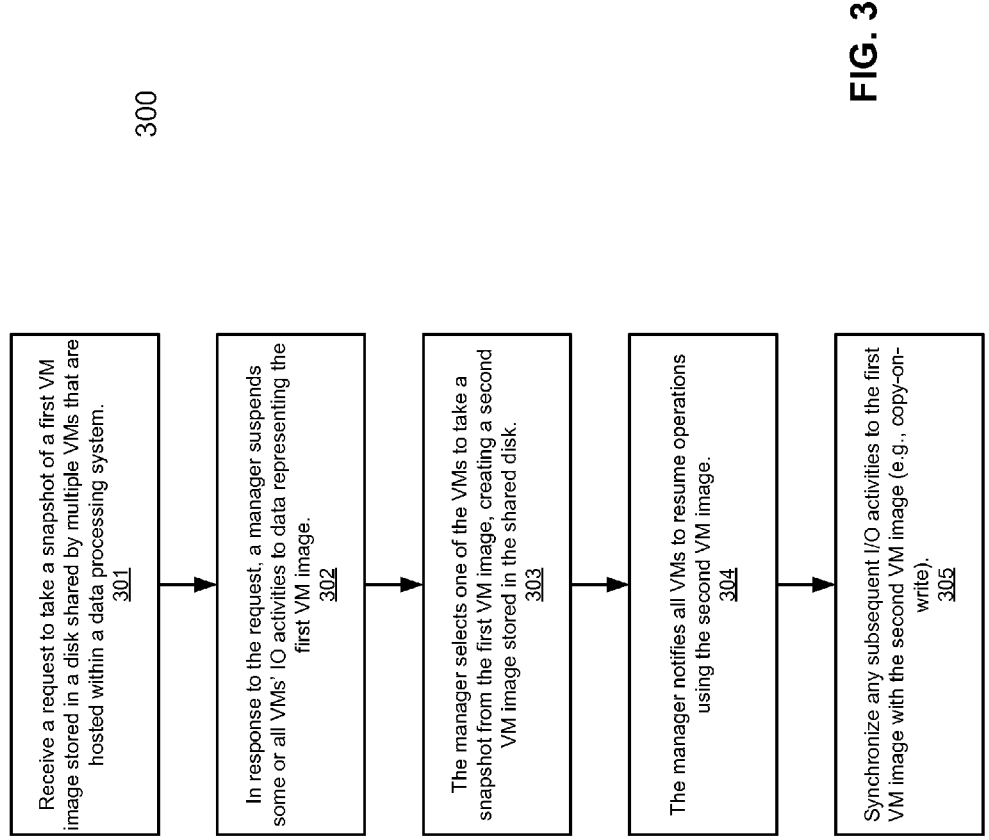
FIG. 3 is a flow diagram illustrating a method for obtaining a snapshot of a VM image according to one embodiment.

FIG. 3 is a flow diagram illustrating a method for obtaining snapshots of VM images according to one embodiment. Note that method 300 may be performed by processing logic which may include software, hardware, or a combination of both. For example, method 300 may be performed by host configuration unit 219 and/or host monitoring unit 220 of FIG. 2. Referring to FIG. 3, at block 301, a request is received to take a snapshot of a first VM image stored in a disk shared by multiple VMs that are hosted by one or more servers. For example, such a request may be received due to a prescheduled backup operation. In response to the request, at block 302, a manager (e.g., managers 110 and/or manager 109 of FIG. 1) suspends IO activities of some or all VMs to data representing the first VM image. Alternatively, the manager suspends the disk access activities to the first image of certain virtual IO devices of the VMs without completely suspending the VMs. At block 303, the manager selects one of the VMs to take a snapshot from the first VM image and to generate a second VM image based on the snapshot to be stored in the shared disk. After the snapshot has been taken and the second VM image has been created, at block 304, the manager notifies all VMs to resume operations using the second VM image. At block 305, any subsequent IO activities are synchronized between the first and second VM images.

Figure 4:
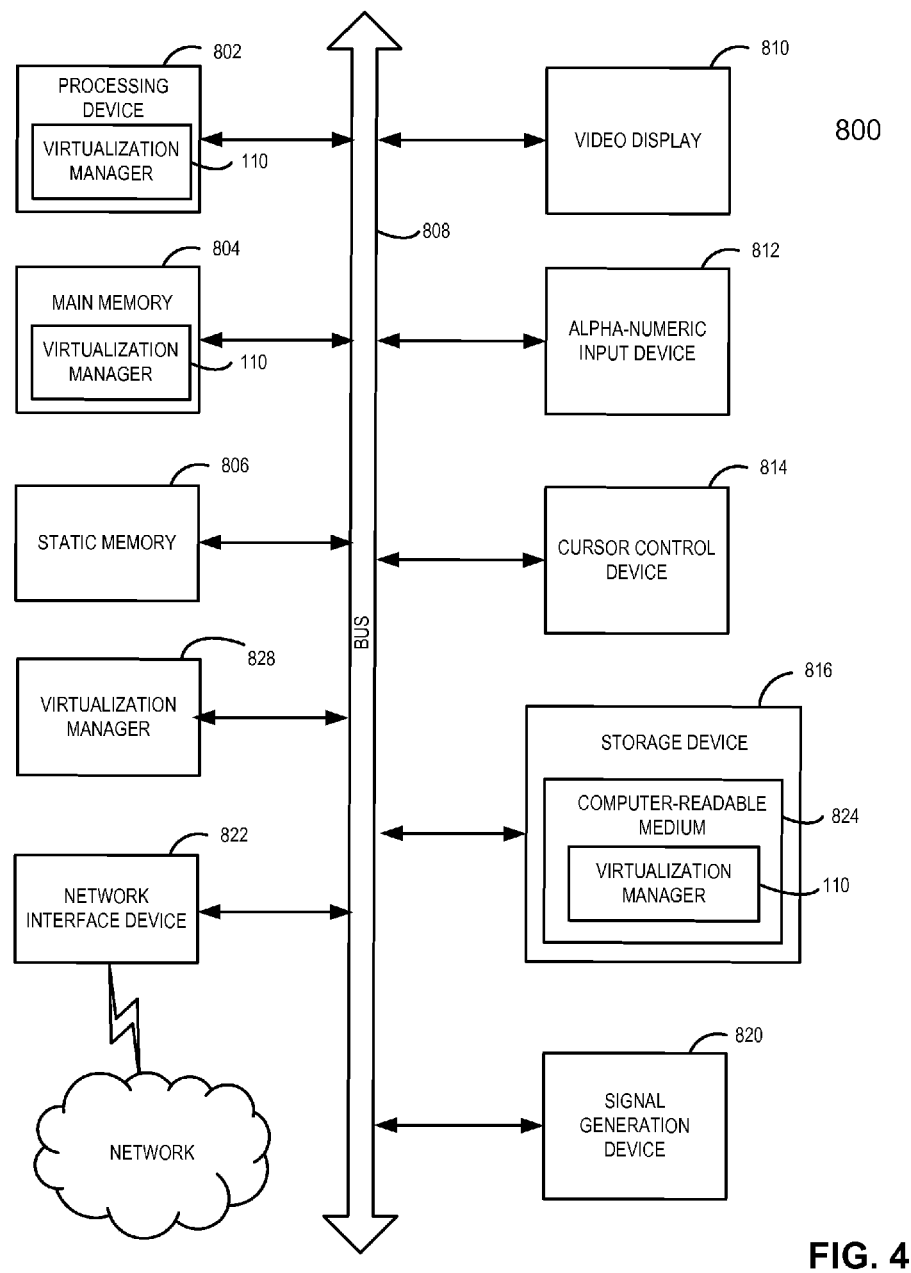
FIG. 4 illustrates a diagrammatic representation of a machine in the exemplary form of a computer system which may be used with an embodiment of the invention.

FIG. 4 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 110 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., virtualization manager 110) embodying any one or more of the methodologies or functions described herein. The virtualization manager 110 may also reside, completely or at least partially, within the main memory 804 and/or within the processing device 802 during execution thereof by the computer system 800, the main memory 804 and the processing device 802 also constituting machine-accessible storage media. The virtualization manager 110 may further be transmitted or received over a network via the network interface device 822.

The computer-readable storage medium 824 may also be used to store the virtualization manager 110 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting" or "causing" or "suspending" or "causing" or "designating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method comprising:

receiving, by a virtualization manager, a request to obtain a snapshot of a first virtual machine (VM) image stored on a storage disk and shared by a plurality of VMs currently running on one or more hosts;

in response to the request, selecting, by a processing device of the virtualization manager, a VM from the plurality of VMs;

causing, by the virtualization manager, a process associated with the selected VM to create a second VM image by capturing a snapshot of the first VM image, and to store the second VM image on the storage disk;

after the second VM image is created, causing, by the virtualization manager, the plurality of VMs to utilize the second VM image when running on the one or more hosts; and maintaining the first VM image as a backup copy for the plurality of VMs.

2. The method of claim 1, further comprising:
suspending at least a portion of activities of the plurality of VMs accessing the first VM image prior to capturing the snapshot; and
causing the plurality of VMs to resume operations using the second VM image after the second VM image has been created.

3. The method of claim 2, further comprising suspending activities of virtual input and output (IO) devices that are used by the plurality of VMs to access the first VM image without suspending the plurality of VMs entirely.

4. The method of claim 1, wherein the selected VM has most IO activities with respect to the first VM image.

5. The method of claim 1, wherein the selected VM is the last VM to be suspended prior to taking the snapshot and wherein the selected VM is the first VM to resume after the snapshot has been taken.

6. The method of claim 1, further comprising designating the first VM image as a read-only image after the second VM image has been created.

7. The method of claim 1, further comprising:
receiving a signal indicating an error occurred in at least one VM of the plurality of VMs when the plurality of VMs switch from using the first VM image to using the second VM image; and
causing the plurality of VMs to roll back from the second VM image to the first VM image in response to the signal.

8. A non-transitory computer-readable storage medium including instructions that, when executed by a processing system, cause the processing system to perform a method comprising:
receiving, by a virtualization manager, a request to obtain a snapshot of a first virtual machine (VM) image stored on a storage disk and shared by a plurality of VMs currently running on one or more hosts;
in response to the request, selecting, by a processing device of the virtualization manager, a VM from the plurality of VMs;
causing, by the virtualization manager, a process associated with the selected VM to create a second VM image by capturing a snapshot of the first VM image, and to store the second VM image on the storage disk;
after the second VM image is created, causing, by the virtualization manager, the plurality of VMs to utilize the second VM image when running on the one or more hosts; and
maintaining the first VM image as a backup copy for the plurality of VMs.

9. The computer-readable storage medium of claim 8, wherein the method further comprises:
suspending at least a portion of activities of the plurality of VMs accessing the first VM image prior to capturing the snapshot; and
causing the plurality of VMs to resume operations using the second VM image after the second VM image has been created.

10. The computer-readable storage medium of claim 9, wherein the method further comprises suspending activities of virtual input and output (IO) devices that are used by the plurality of VMs to access the first VM image without suspending the plurality of VMs entirely.

11. The computer-readable storage medium of claim 8, wherein the selected VM has most IO activities to the first VM image.

12. The computer-readable storage medium of claim 8, wherein the selected VM is the last VM to be suspended prior to taking the snapshot and wherein the selected VM is the first VM to resume after the snapshot has been taken.

13. The computer-readable storage medium of claim 8, wherein the method further comprises designating the first VM image as a read-only image after the second VM image has been created.

14. The computer-readable storage medium of claim 8, wherein the method further comprises:
receiving a signal indicating an error occurred in at least one VM of the plurality of VMs when the plurality of VMs switch from using the first VM image to using the second VM image; and
causing the plurality of VMs to roll back from the second VM image to the first VM image in response to the signal.

15. A system, comprising:
a host configuration unit to receive a request to obtain a snapshot of a first virtual machine (VM) image stored on a storage disk and shared by a plurality of VMs currently running on one or more hosts, wherein in response to the request, the host configuration unit selects a VM from the plurality of VMs, and causes a process associated with the selected VM to create a second VM image by capturing a snapshot of the first VM image, and to store the second VM image on the storage disk; and
a host monitoring unit coupled to the host configuration unit to receive a signal from the selected VM indicating that the second VM image has been created, wherein in response to the signal, the host configuration unit is configured to cause the plurality of VMs to switch from using the first VM image to using the second VM image when running on the one or more hosts, and to maintain the first images as a backup copy for the plurality of VMs.

16. The system of claim 15, wherein the host configuration unit is configured to suspend at least a portion of activities of the plurality of VMs accessing the first VM image prior to capturing the snapshot, and to cause the plurality of VMs to resume operations using the second VM image after the second VM image has been created.

17. The system of claim 16, wherein activities of virtual input and output (IO) devices that are used by the plurality of VMs to access the first VM image are suspended without suspending the plurality of VMs entirely.

18. The system of claim 15, wherein the selected VM has most IO activities to the first VM image.

19. The system of claim 15, wherein the selected VM is the last VM to be suspended prior to taking the snapshot and wherein the selected VM is the first VM to resume after the snapshot has been taken.

20. The system of claim 15, wherein the first VM image is designated as a read-only image after the second VM image has been created.

21. The system of claim 15, wherein the host monitoring unit is configured to receive a signal indicating an error occurred in at least one VM of the plurality of VMs when the plurality of VMs switch from using the first VM image to using the second VM image, and wherein the host configuration unit is configured to cause the plurality of VMs to roll back from the second VM image to the first VM image in response to the signal.

* * * * *